(12) United States Patent
Byeon et al.

(10) Patent No.: US 12,354,378 B2
(45) Date of Patent: Jul. 8, 2025

(54) METHOD AND APPARATUS FOR DETERMINING SLOPE OF ROAD USING SIDE VIEW CAMERA OF VEHICLE

(71) Applicant: Samsung Electronics Co., Ltd., Suwon-si (KR)

(72) Inventors: Moonsub Byeon, Seoul (KR); Nayeon Kim, Suwon-si (KR); Dae Hyun Ji, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 456 days.

(21) Appl. No.: 17/685,917

(22) Filed: Mar. 3, 2022

(65) Prior Publication Data

US 2023/0027728 A1 Jan. 26, 2023

(30) Foreign Application Priority Data

Jul. 22, 2021 (KR) ........................ 10-2021-0096488

(51) Int. Cl.
| | | |
|---|---|---|
| *B60R 11/04* | (2006.01) | |
| *B60W 50/00* | (2006.01) | |
| *G06V 10/26* | (2022.01) | |
| *G06V 20/56* | (2022.01) | |

(52) U.S. Cl.
CPC ............ *G06V 20/588* (2022.01); *B60R 11/04* (2013.01); *B60W 50/0098* (2013.01); *G06V 10/267* (2022.01); *B60W 2420/403* (2013.01); *B60W 2552/15* (2020.02)

(58) Field of Classification Search
CPC .. G06V 20/588; G06V 10/267; G06V 10/507; B60R 11/04; B60W 50/0098; B60W 2420/403; B60W 2552/15; B60W 40/076; B60W 40/11; B60W 2050/0005; B60W 2520/16; B60W 2552/20
See application file for complete search history.

(56) References Cited

U.S. PATENT DOCUMENTS

| | | | |
|---|---|---|---|
| 9,884,623 B2 | 2/2018 | Fasola et al. | |
| 2010/0033571 A1* | 2/2010 | Fujita ................... | G06V 20/584 |
| | | | 348/149 |
| 2015/0285614 A1* | 10/2015 | Okada ................. | B60W 40/072 |
| | | | 702/155 |
| 2019/0092290 A1* | 3/2019 | Czarnecki ................ | B60T 8/17 |
| 2019/0291728 A1* | 9/2019 | Shalev-Shwartz .... | B60W 30/09 |
| 2019/0325595 A1* | 10/2019 | Stein ...................... | G06V 20/58 |

(Continued)

FOREIGN PATENT DOCUMENTS

| | | |
|---|---|---|
| CN | 111578955 A | 8/2020 |
| EP | 3 418 122 B1 | 7/2020 |

(Continued)

*Primary Examiner* — Andrew W Bee
*Assistant Examiner* — D J Dhooge
(74) *Attorney, Agent, or Firm* — NSIP Law

(57) ABSTRACT

A method and apparatus for determining a slope of a road using a side view camera of a vehicle, the method includes identifying a road image collected from a side view camera, dividing the road image into a plurality of regions, calculating a slope of a road for each of the plurality of regions based on driving lanes comprised in each of the plurality of regions, and determining a slope between the side view camera and the road using the slope of the road calculated for each of the plurality of regions.

17 Claims, 5 Drawing Sheets

(56) References Cited

U.S. PATENT DOCUMENTS

| | | | |
|---|---|---|---|
| 2020/0051282 A1* | 2/2020 | Watanabe | G06T 7/593 |
| 2020/0117920 A1* | 4/2020 | Lee | G06T 17/05 |
| 2020/0200260 A1* | 6/2020 | Ooshima | B60W 10/04 |
| 2021/0094577 A1* | 4/2021 | Shalev-Shwartz | B60W 30/09 |

FOREIGN PATENT DOCUMENTS

| | | |
|---|---|---|
| JP | 2008-309519 A | 12/2008 |
| JP | 2010-233080 A | 10/2010 |
| JP | 5213578 B2 | 6/2013 |
| JP | 2015-226240 A | 12/2015 |
| KR | 10-2021-0148756 A | 12/2021 |

* cited by examiner

METHOD AND APPARATUS FOR DETERMINING SLOPE OF ROAD USING SIDE VIEW CAMERA OF VEHICLE

CROSS-REFERENCE TO RELATED APPLICATIONS

This application claims the benefit under 35 USC § 119(a) of Korean Patent Application No. 10-2021-0096488, filed on Jul. 22, 2021, at the Korean Intellectual Property Office, the entire disclosure of which is incorporated herein by reference for all purposes.

BACKGROUND

Field

The following description relates to a method and apparatus for determining a slope of a road using a side view camera of a vehicle, and more particularly, to estimating a profile of the road by estimating or determining a pitch of the vehicle.

Description of Related Art

Recently, technologies for autonomous driving (AD) systems and advanced driver assistance systems (ADAS) are been developed. In an AD system or an ADAS, identifying a pitch angle of a vehicle and a profile of a road through a camera may be important.

A pitch angle of a vehicle may be estimated using a front camera of the vehicle. However, since the pitch angle is determined under the assumption that driving lanes are parallel and a width of a driving lane is constant, an accurate pitch angle may not be accurately calculated when a structure such as a speed bump is present or a surface of a road is not flat.

In addition, when the pitch angle of the vehicle is calculated using an inertial measurement unit (IMU) sensor, a relative pitch angle between a road and a camera of an uphill road or a downhill road may not be accurately calculated. Thus, a technology for accurately calculating the slope of the road is needed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a processor-implemented method of determining a slope of a road using a side view camera of a vehicle, the method including identifying a road image collected from a side view camera, dividing the road image into a plurality of regions, calculating a slope of a road for each of the plurality of regions based on driving lanes comprised in each of the plurality of regions, and determining a slope between the side view camera and the road using the slope of the road calculated for each of the plurality of regions.

The method may include determining a pitch angle of a vehicle based on the slope between the side view camera and the road.

The method of may include determining a profile of the road based on the slope between the side view camera and the road.

The each of the plurality of regions may have a constant horizontal length.

The calculating of the slope of the road for each region may include determining a distance between a driving lane comprised in a region located in a center of the road image from among the plurality of regions and the side view camera, and determining the slope of the road in remaining regions based on the determined distance.

The calculating of the slope of the road for each region may include determining the slope of the road for each region by converting a camera coordinate system of the side view camera into a real coordinate system for the road using an inner parameter of the side view camera.

The calculating of the slope of the road for each region may include determining a straight line distance between the side view camera and a driving lane comprised in a region of the plurality of regions, and determining a slope of the road in remaining regions of the plurality of regions based on the determined distance.

The calculating of the slope of the road for the each of the plurality of regions may include in response to a region of the plurality of regions comprising a plurality of driving lanes, calculating the slope of the road for the region using a mean value of slopes determined for each of the plurality of driving lanes.

The calculating of the slope of the road for each region may include calculating the slope of the road for the each region based on a curbstone in the each region.

The calculating of the slope of the road for each region may include calculating the slope of the road for the each region based on the driving lanes and a curbstone in the each region.

In one general aspect, there is provided an apparatus for determining a slope of a road using a side view camera of a vehicle, the apparatus including a processor configured to identify a road image collected from a side view camera, divide the road image into a plurality of regions, calculate a slope of a road for each of the plurality of regions based on driving lanes comprised in each of the plurality of regions, and determine a slope between the side view camera and the road using the slope of the road calculated for each of the plurality of regions.

The processor may be configured to determine a pitch angle of a vehicle based on the slope between the side view camera and the road.

The processor may be configured to determine a profile of the road based on the slope between the side view camera and the road.

The processor may be configured to divide the road image into the plurality of regions, each of the plurality of regions having a constant horizontal length.

The processor may be configured to determine a distance between a driving lane comprised in a region located in a center of the road image from among the plurality of regions and the side view camera, and to determine the slope of the road in remaining regions based on the determined distance.

The processor may be configured to determine the slope of the road for each region by converting a camera coordinate system of the side view camera into a real coordinate system for the road using an inner parameter of the side view camera.

Figure 1:
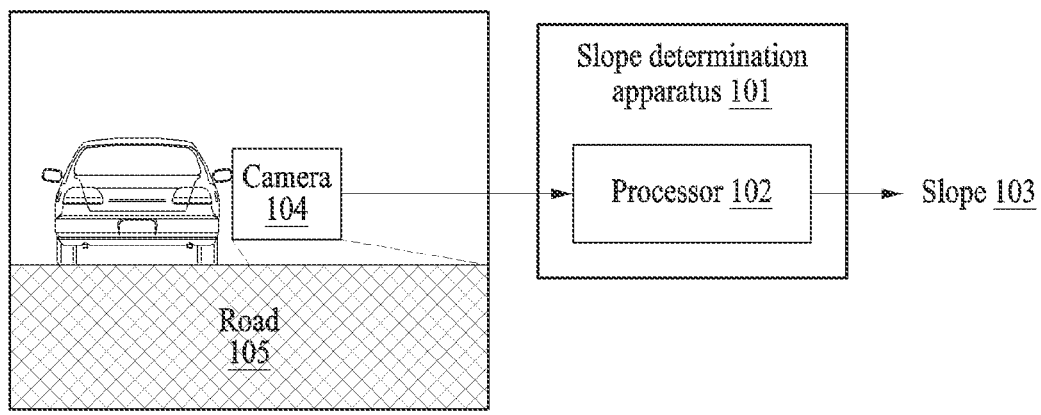
FIG. 1 illustrates an example of an apparatus for determining a slope.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

Although terms such as "first," "second," and "third," A, B, (a), (b) or the like may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

The use of the term "may" herein with respect to an example or embodiment (e.g., as to what an example or embodiment may include or implement) means that at least one example or embodiment exists where such a feature is included or implemented, while all examples are not limited thereto.

Hereinafter, examples will be described in detail with reference to the accompanying drawings. When describing the examples with reference to the accompanying drawings, like reference numerals refer to like components and a repeated description related thereto will be omitted.

FIG. 1 illustrates an example of an apparatus for determining a slope.

An apparatus for determining a slope of a road, hereinafter simply a slope determination apparatus 101, may include a processor 102. The processor 102 may perform a method of determining the slope of the road. In an example, the slope determination apparatus 101 may be an electronic apparatus included in a vehicle. In another example, the slope determination apparatus 101 may be an electronic apparatus not included in the vehicle, such as, for example, a smartphone, a smart watch, a computer, a GPS device, a music player, or a game console. In another example, the slope determination apparatus 101 may be a server that receives an image of the road (hereinafter simply a road image) through wireless communication from a side view camera 104 mounted on the vehicle.

The slope determination apparatus 101 may receive the road image from the side view camera 104 mounted on a side of the vehicle. The side view camera 104 may be installed on the side of the vehicle. The side view camera 104 may capture a road 105 on the side of the vehicle and collect the road image associated with a surrounding road of the side of the vehicle. An inner parameter of the side view camera 104 may be preset. The inner parameter may include a focal length and a principal point of the side view camera 104. In an example, a pinhole camera model may be used as the side view camera 104.

The slope determination apparatus 101 may determine a slope 103 of the road 105 using the road image received from the side view camera 104. The slope 103 of the road 105 may be determined using the road image received from the side view camera 104, which will be described hereinafter with reference to FIG. 2.

The slope determination apparatus 101 may determine the slope 103 of the road 105 using the road image collected from the side view camera 104, and thus estimate a pitch angle of the vehicle or a profile of the road 105.

Autonomous driving (AD) systems and advanced driver assistance systems (ADAS) may be applied according to the various examples described herein. Recognition technologies using a surround view monitor (SVM) system and a rear-view camera (RVC) system may be applied according to the various examples described herein.

The slope determination apparatus 101 may correct the pitch angle of the vehicle, the pitch angle may be determined by the road image collected from the side view camera 104 of the vehicle, based on the slope 103 of the road 105, the slope being determined by the side view camera 104. The pitch angle may be corrected, the operation of which will be described hereinafter with reference to FIG. 4.

The slope determination apparatus 101 for determining the slope 103 of the road 105 may determine a profile of the road 105, and when the road image is displayed on a display, the driver may determine the slope 103 of the road 105.

Figure 2:
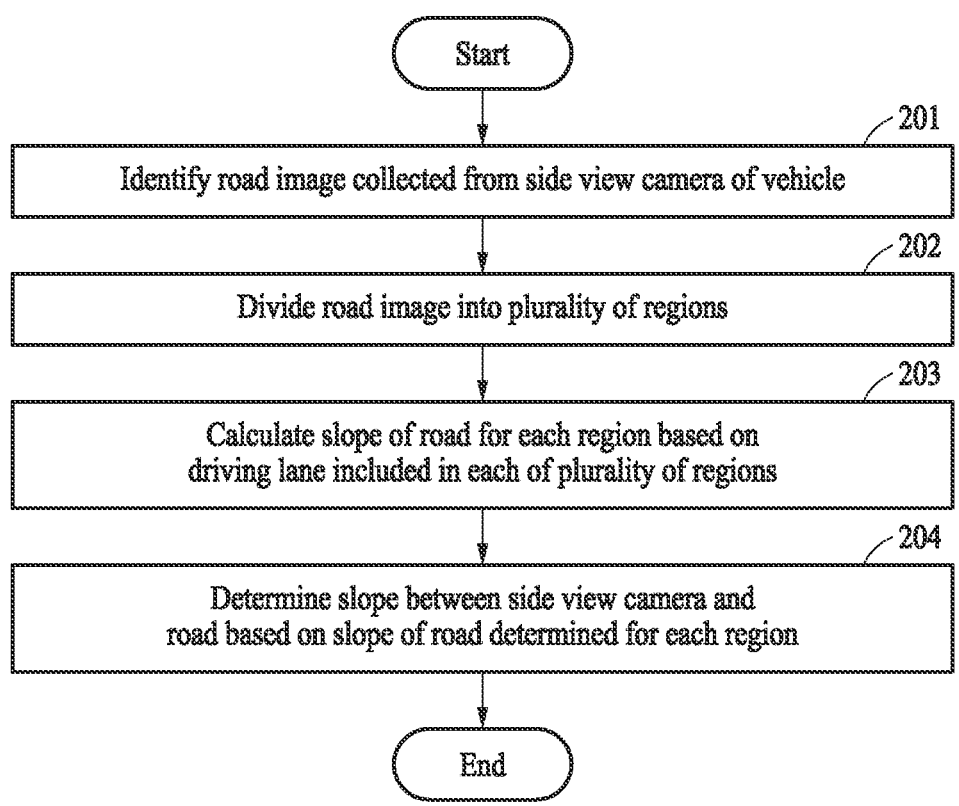
FIG. 2 illustrates an example of a method of determining a slope.

FIG. 2 illustrates an example of a method of determining a slope. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer, such as a processor, that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

In operation 201, the slope determination apparatus 101 may identify a road image collected from a side view camera. The road image collected from the side view camera may include driving lanes of a road. The road image may include an image of the driving lanes. The driving lanes of the road may be parallel to a vehicle. A horizontal axis of the road image may be the same as a traveling direction of the vehicle.

In an example, a distance between each of the driving lanes and the vehicle may be the same. In this example, each of the driving lanes of the road in a real coordinate system may be on a straight line. The horizontal axis of the road image collected from the side view camera may be parallel to the driving lanes.

In an example, the road image collected from the side view camera may include a curbstone that is a boundary stone between a road and a pedestrian path. The curbstone may be parallel to the vehicle or the driving lanes. In this example, a distance between the curbstone and the vehicle may also be the same. Curbstones may be on a straight line in the real coordinate system. The slope determination apparatus 101 may use the curbstone in the road image and the driving lanes in the same manner.

In operation 202, the slope determination apparatus 101 may divide the road image into a plurality of regions. The plurality of regions in the road image may have a constant horizontal length. A vertical length of each of the plurality of regions may be the same as a vertical length of the road image, and the constant horizontal length may be determined differently. That is, the slope determination apparatus 101 may divide the road image into the plurality of regions using lines that are parallel to a vertical axis.

In operation 203, the slope determination apparatus 101 may calculate the slope of the road for each region based on the driving lanes included in each region. The slope of the road may correspond to a roll angle of the road.

The slope determination apparatus 101 may determine the slope of the road for each region by converting a camera coordinate system of the side view camera into a real coordinate system for the road using an inner parameter of a camera. The real coordinate system for the road and the camera coordinate system may have a relationship as represented by Equation 1 below.

$$\begin{bmatrix} u \\ v \\ 1 \end{bmatrix} = \frac{1}{s} \cdot \begin{bmatrix} f_X & 0 & c_X \\ 0 & f_Y & c_Y \\ 0 & 0 & 1 \end{bmatrix} \cdot \begin{bmatrix} \cos\theta \cdot X' - \sin\theta \cdot Z' + h \cdot \sin\theta \\ -\sin\theta \cdot X' - \cos\theta \cdot Z' + h \cdot \cos\theta \\ Y' \end{bmatrix} \quad \text{[Equation 1]}$$

In Equation 1, u and v denote coordinates of a horizontal axis and a vertical axis of pixel coordinates on a road image. X', Y', and Z' denote components of three-dimensional (3D) coordinates on a real coordinate system including an X axis, a Y axis, and a Z axis. Since the road image includes a capture of a road, Z of the Z axis, which is a height axis in a sky direction, may be determined as 0. Y' denotes a distance of a point from the vehicle in the real coordinate system.

fx and fy denote focal lengths of a side view camera and may be fixed values based on the side view camera. cx and cy denote principal points of the side view camera and may be preset values. h denotes a height at which the side view camera is installed and may represent the height of the side view camera from a road surface. θ denotes a slope of the road and may represent a roll angle of the road. θ denotes a relative slope between the side view camera and the road.

In an example, by using a point at which Z' is 0, a Taylor series expansion may be applied to cos θ and sin θ, and a first order approximation may be represented. Equation 1 may be represented by Equation 2 below, a representation of Y'.

$$Y'(\theta, h) = \frac{-f_X \cdot f_Y \cdot h \cdot (\theta^2 + 1)}{f_Y \cdot \theta \cdot (c_X - u) + f_X(c_Y - v)} \quad \text{[Equation 2]}$$

Variables in Equations 1 and 2 may have the same meaning. In Equation 2, all of the variables excluding θ, u, and v may be fixed values, and thus Y' may be determined based on θ, u, and v.

The slope determination apparatus 101 may determine a distance between a driving lane included in a region in a center of the road image among the plurality of regions and the side view camera. The region in the center of the road image may correspond to a middle position on the horizontal axis of the road image. For example, the region in the center of the road image and a relative slope of the road may be closely similar, and thus determined to be 0.

In this example, since the slope of the road in a region included in a center region is determined as 0, the slope determination apparatus 101 may determine the distance between the driving lane and the side view camera based on pixel coordinates on the road image of the driving lane included in the center region according to Equation 2.

In this example, since the driving lane is parallel to the vehicle and is on a straight line, a straight-line distance (e.g., Y' value) between the side view camera and the driving lane may be the same in remaining regions. The slope determination apparatus 101 may determine the slope of the road in the remaining regions based on the determined distance.

In an example, based on the driving lane in which the distance Y' in Equation 2 is determined in each of the remaining regions, the slope θ of the road in Equation 2 may be determined using the pixel coordinates u and v in Equation 2 on the road image of the driving lane. When the region includes a plurality of driving lanes, the slope determination apparatus 101 may determine a slope of a region using a mean value of slopes determined for each driving lane.

For example, the slope determination apparatus 101 may calculate the slope of the road for each region based on a curbstone included in each of the plurality of regions. The slope determination apparatus 101 may calculate the slope of the road for each region based on the curbstone included in each of the plurality of regions in the same manner as the slope determination apparatus 101 calculates the slope of the road for each region based on the driving lane included in each of the plurality of regions.

In another example, the slope determination apparatus 101 may calculate the slope of the road for each region based on the curbstone and the driving lane included in each of the plurality of regions. When the curbstone and the driving lane are included in the road image collected by the slope determination apparatus 101, the slope determination apparatus 101 may determine a slope determined for the curbstone and the driving lane based on the curbstone and the driving lane.

In operation 204, the slope determination apparatus 101 may determine the slope between the side view camera and the road using the slope of the road calculated for each region. The slope determination apparatus 101 may determine the slope between the side view camera and the road using a mean value of slopes of the road calculated for each region.

Figure 3A:
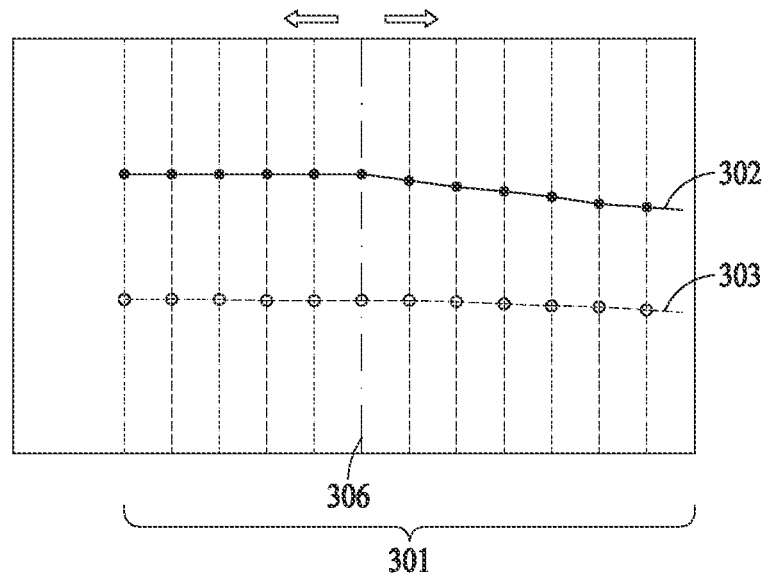
FIGS. 3A and 3B illustrate examples of comparing driving lanes included in a road image and driving lanes in a real coordinate system.
Figure 3B:
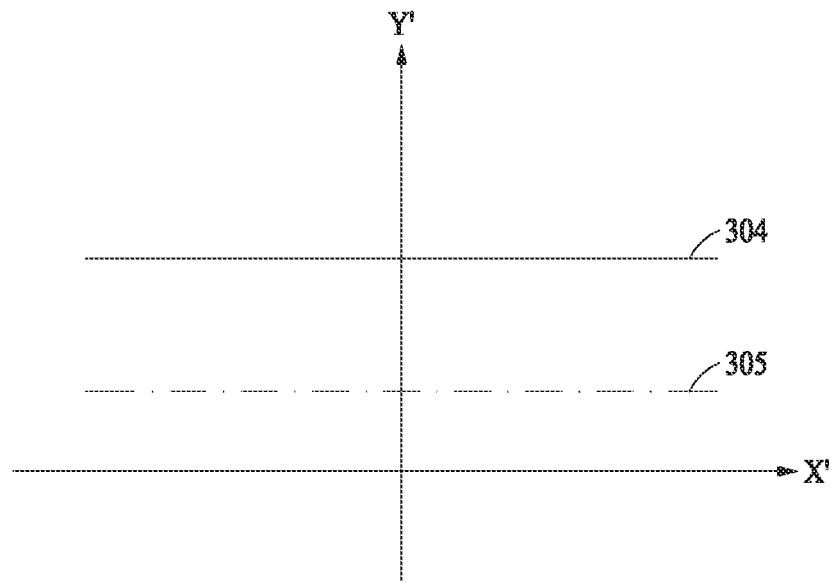

FIGS. 3A and 3B illustrate examples of comparing driving lanes included in a road image and driving lanes in a real coordinate system.

FIG. 3A illustrates a road image including driving lanes 302 and 303. Referring to FIG. 3A, a driving lane 303 may be the closest lane to a vehicle. FIG. 3B illustrates driving lanes 304 and 305 in a real coordinate system.

Referring to FIG. 3B, the vehicle may move in a positive direction of an X' axis, and a side view camera of the vehicle may be positioned in a way in which Y' is 0. Referring to FIGS. 3A and 3B, an actual driving lane 304 may be formed as a straight line, but a driving lane 302 in the road image may be different from the actual driving lane 304 due to a relative slope of the side view camera and the road. However, a slope of the driving lane 303 that is the closest to the vehicle may not change greatly.

Referring to FIG. 3A, a relative slope of a side view camera and a road in a center region 306 among divided regions 301 may be 0. Referring to FIG. 3A, due to a downhill road in front of a vehicle, the relative slope of the side view camera and the road in regions on a right side among the divided regions 301 may be a value that is not 0.

In an example, the road image may include driving lanes and/or curbstones. For example, FIGS. 3A and 3B illustrating the road image and the real coordinate system may be construed as a diagram illustrating the driving lanes 303 and 305 and curbstones of the driving lanes 302 and 304.

Figure 4A:
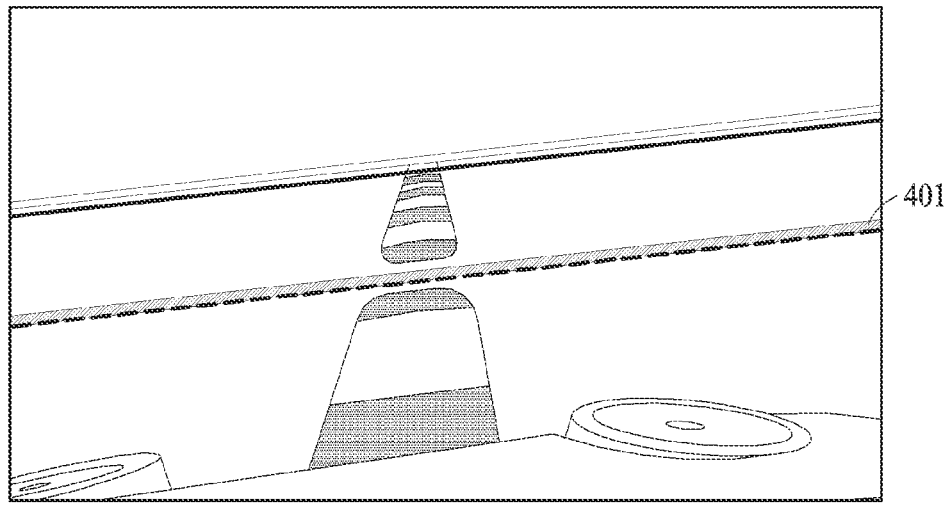
FIGS. 4A and 4B illustrate examples of road images collected by a side view camera.
Figure 4B:
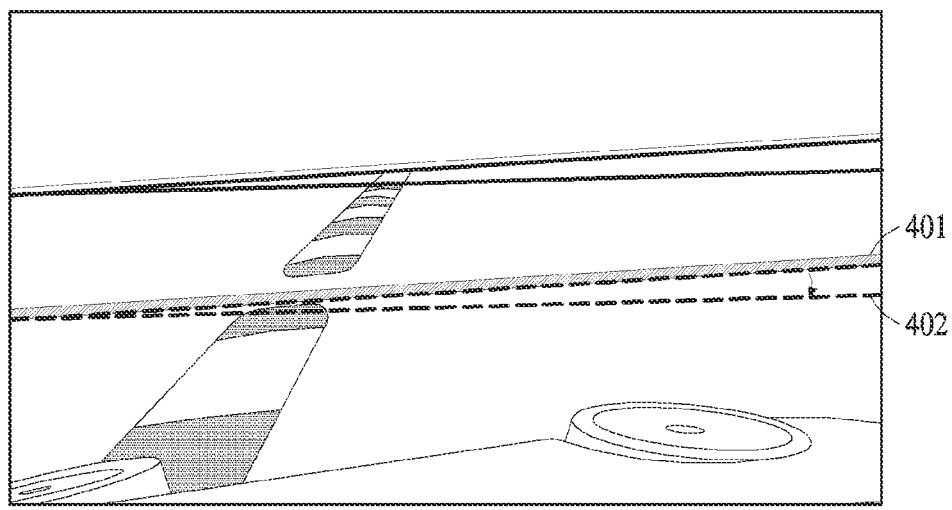

FIGS. 4A and 4B illustrate examples of road images collected by a side view camera.

FIG. 4A illustrates a road image collected by a side view camera before a vehicle climbs a speed bump. Referring to FIG. 4A, a position of a driving lane 401 may be estimated using a regular side view camera.

FIG. 4B illustrates a road image collected by a side view camera when a vehicle climbs a speed bump. When the vehicle climbs the speed bump, the actual slope of the road may not change, but the slope may be recognized as having changed because a pitch of the vehicle changes. Referring to FIG. 4B, an estimated driving lane 402 and an actual lane may be different.

In this example, since the slope of the road is determined by dividing the road image into a plurality of regions, the slope of the road may be accurately determined. A pitch angle of the vehicle determined using a front camera may be corrected based on the slope of the road.

Figure 5:
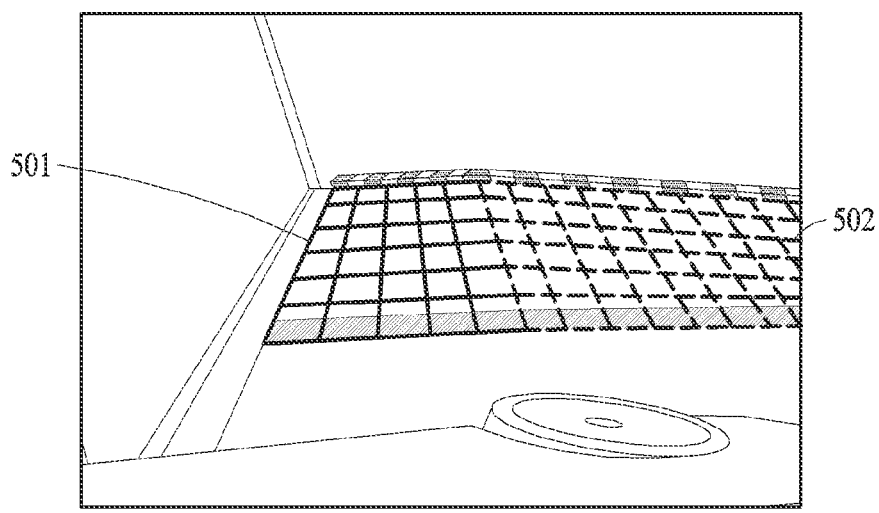
FIG. 5 illustrates an example of estimating a profile of a road using a determined slope of the road.

FIG. 5 illustrates an example of estimating a profile of a road using a determined slope of the road.

FIG. 5 illustrates a profile of a road displayed on a display. A slope determination apparatus may generate the profile of the road based on a slope determined for each region. The slope determination apparatus may indicate an edited road image to allow easier recognition of a change in the slope by setting a region having a road with the same slope to have the same color. The profile of the road may indicate the edited road image. The edited road image may be output to a display.

Referring to FIG. 5, a region 501 of the road and a slope of a region 502 may be different from each other. Referring to the region 502, the direction of the road that the vehicle is traveling on may be recognized as downhill.

The slope determination apparatus, and other apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods illustrated in FIGS. 1-5 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. In an example, the instructions or software includes at least one of an applet, a dynamic link library (DLL), middleware, firmware, a device driver, an application program storing the method of determining a slope of a road. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque(STT)-MRAM, static random-access memory (SRAM), thyristor RAM (T-RAM), zero capacitor RAM (Z-RAM), twin transistor RAM (TTRAM), conductive bridging RAM(CBRAM), ferroelectric RAM (FeRAM), phase change RAM (PRAM), resistive RAM(RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, the method comprising:
    collecting, using a side view camera of a vehicle, an image of a road on a side of the vehicle;
    calculating a respective extent of inclination or declination of the road, for each of two or more regions among a plurality of defined regions of the image, based on one or more corresponding driving lanes comprised in a corresponding region of the two or more regions; and
    generating pitch information of the vehicle based on a final extent of inclination or declination of the road, the final extent being a mean value determined based on the calculated respective extents of inclination or declination of the road.

2. The method of claim 1, comprising generating the pitch information by determining a pitch angle of the vehicle based on the final extent of inclination or declination of the road.

3. The method of claim 1, comprising generating profile information of the road based on the final extent of inclination or declination of the road.

4. The method of claim 1, further comprising defining the plurality of defined regions such that each of the plurality of defined regions are sequentially arranged with equal widths in the image relative to a longitudinal direction of the vehicle.

5. The method of claim 1, wherein the calculating of the respective extent of inclination or declination of the road for each of the two or more regions comprises:
determining a distance between a driving lane comprised in a first region, located in a center of the road image, from among the plurality of defined regions and the side view camera; and
calculating, for each of the two or more regions, the respective extent of inclination or declination of the road based on the determined distance.

6. The method of claim 1, wherein the calculating of the respective extent of inclination or declination of the road for each of the two or more regions comprises calculating the respective extent of inclination or declination of the road for each of the two or more regions based on a result of converting a camera coordinate system of the side view camera into a real coordinate system for the road using an inner parameter of the side view camera.

7. The method of claim 6, wherein the calculating of the respective extent of inclination or declination of the road for each of the two or more regions comprises:
determining a straight line distance between the side view camera and a driving lane comprised in a first region of the plurality of defined regions; and
calculating, for each of the two or more regions, the respective extent of inclination or declination of the road based on the determined distance.

8. The method of claim 1, wherein the calculating of the respective extent of inclination or declination of the road for the each of the two or more regions comprises:
in response to a first region of the plurality of defined regions comprising a plurality of driving lanes, calculating the respective extent of inclination or declination of the road for the first region using a mean value of first extents of inclination or declination of the road respectively determined for each of the plurality of driving lanes.

9. The method of claim 1, wherein the calculating of the respective extent of inclination or declination of the road for each of the two or more regions comprises:
calculating, for each of the two or more regions, the respective extent of inclination or declination of the road based on the one or more corresponding driving lanes and a curbstone in the corresponding region.

10. The method of claim 1, wherein the calculating of the respective extent of inclination or declination of the road for each of the two or more regions comprises:
calculating, for each of the two or more regions, the respective extent of inclination or declination of the road based on the two or more corresponding driving lanes and a curbstone in the corresponding region.

11. A non-transitory computer-readable storage medium storing instructions that, when executed by a processor, cause the processor to perform the method of claim 1.

12. An apparatus, the apparatus comprising:
one or more processors configured to:
calculate a respective extent of inclination or declination of a road on a side of a vehicle, for each of two or more regions among a plurality of defined regions of an image of the road, based on one or more corresponding driving lanes comprised in a corresponding region of the two or more regions; and
generate pitch information of the vehicle and profile information of the road based on a final extent of inclination or declination of the road, the final extent being a mean value determined based on the calculated respective extents of inclination or declination of the road,
wherein the image is a side view image captured by a side view camera of the vehicle.

13. The apparatus of claim 12, wherein the one or more processors are configured to generate the pitch information through a determination of a pitch angle of the vehicle based on the final extent of inclination or declination of the road.

14. The apparatus of claim 12, wherein the profile information of the road indicates an edited one of the image.

15. The apparatus of claim 12, wherein the one or more processors are further configured to define the plurality of defined regions such that each of the plurality of defined regions are sequentially arranged with equal widths in the image relative to a longitudinal direction of the vehicle.

16. The apparatus of claim 12, wherein, for the calculating of the respective extent of inclination or declination of the road for each of the two or more regions, the one or more processors are configured to:
determine a distance between a driving lane comprised in a first region, located in a center of the road image, from among the plurality of defined regions and the side view camera; and
calculate, for each of the two or more regions, the respective extent of inclination or declination of the road based on the determined distance.

17. The apparatus of claim 12, wherein, for the calculating of the respective extent of inclination or declination of the road for each of the of the two or more regions, the one or more processors are configured to calculate the respective extent of inclination or declination of the road for each of the two or more regions based on a result of a conversion of a camera coordinate system of the side view camera into a real coordinate system for the road using an inner parameter of the side view camera.

* * * * *